United States Patent
Guo et al.

(10) Patent No.: US 10,728,234 B2
(45) Date of Patent: Jul. 28, 2020

(54) METHOD, SYSTEM AND DEVICE FOR SECURITY CONFIGURATIONS

(71) Applicant: Alibaba Group Holding Limited, George Town (KY)

(72) Inventors: Yuehua Guo, Hangzhou (CN); Honggang Tang, Hangzhou (CN)

(73) Assignee: Alibaba Group Holding Limited (KY)

( * ) Notice: Subject to any disclaimer, the term of this patent is extended or adjusted under 35 U.S.C. 154(b) by 246 days.

(21) Appl. No.: 15/899,619

(22) Filed: Feb. 20, 2018

(65) Prior Publication Data

US 2018/0241731 A1    Aug. 23, 2018

Related U.S. Application Data

(63) Continuation-in-part of application No. PCT/CN2016/094663, filed on Aug. 11, 2016.

(30) Foreign Application Priority Data

Aug. 20, 2015    (CN) .......................... 2015 1 0514982

(51) Int. Cl.
| | |
|---|---|
| H04L 29/06 | (2006.01) |
| G06F 21/57 | (2013.01) |
| G06F 21/62 | (2013.01) |
| G06F 21/44 | (2013.01) |
| H04L 12/24 | (2006.01) |
| H04L 29/08 | (2006.01) |
| H04W 12/06 | (2009.01) |

(52) U.S. Cl.
CPC .............. *H04L 63/08* (2013.01); *G06F 21/44* (2013.01); *G06F 21/57* (2013.01); *G06F 21/629* (2013.01); *H04L 41/0803* (2013.01); *H04L 63/104* (2013.01); *H04L 63/20* (2013.01); *H04L 67/34* (2013.01); *H04W 12/06* (2013.01)

(58) Field of Classification Search
CPC .............................. H04L 63/08; H04L 63/104
USPC .............................................................. 726/5
See application file for complete search history.

(56) References Cited

U.S. PATENT DOCUMENTS

| | | | |
|---|---|---|---|
| 8,490,148 B2 | 7/2013 | Sikka | |
| 9,407,604 B2* | 8/2016 | Smith | ..................... H04L 12/56 |
| 2007/0168332 A1 | 7/2007 | Bussard | |
| 2010/0138650 A1* | 6/2010 | Kang | ..................... H04L 63/065 |
| | | | 713/153 |
| 2012/0185910 A1 | 7/2012 | Miettinen | |
| 2014/0380477 A1* | 12/2014 | Li | ....................... H04L 63/1466 |
| | | | 726/23 |

FOREIGN PATENT DOCUMENTS

| | | |
|---|---|---|
| CN | 101111053 | 12/2010 |
| CN | 101296138 | 9/2011 |
| CN | 102957742 | 3/2013 |
| CN | 103838989 | 6/2014 |
| CN | 104539612 | 4/2015 |
| WO | 2009066858 | 5/2009 |

* cited by examiner

*Primary Examiner* — Longbit Chai
(74) *Attorney, Agent, or Firm* — Van Pelt, Yi & James LLP

(57) ABSTRACT

Configuring security settings, including: receiving a request to join a security group from a first terminal device; obtaining security setting information for the security group; and sending a response to the first terminal device, the response instructing the first terminal device to join the security group and to configure security settings according to the security setting information.

42 Claims, 6 Drawing Sheets

METHOD, SYSTEM AND DEVICE FOR SECURITY CONFIGURATIONS

CROSS REFERENCE TO OTHER APPLICATIONS

This application is a continuation-in-part of and claims priority to International (PCT) Application No. PCT/CN16/94663 entitled SECURITY CONFIGURATION METHOD, RELATED DEVICE AND SYSTEM filed Aug. 11, 2016 which is incorporated herein by reference for all purposes, which claims priority to People's Republic of China Patent Application No. 201510514982.0 entitled A SECURITY CONFIGURATION METHOD AND ASSOCIATED MEANS AND SYSTEM filed Aug. 20, 2015 which is incorporated herein by reference for all purposes.

FIELD OF THE INVENTION

The present application relates to the field of network data processing, and in particular, to a method, system and device for configuring security settings for terminal devices.

BACKGROUND OF THE INVENTION

As a result of their ever-growing functionalities, smart terminal devices, such as smart phones, tablets, personal computers, wearable devices, etc., are becoming more and more commonplace in people's everyday life. In addition to the conventional services of telephonic communication, text messaging and web browsing, smart terminal devices are further equipped to augment the on-device functionalities by allowing the users to download and thereby access applications (hereinafter, apps) provided from third party service providers. However, the enhanced convenience of mobile apps nevertheless gives rise to heightened concerns of user data security.

For example, oftentimes, users input, exchange and store sensitive and/or confidential information on the device by virtue of both utilizing the conventional functionalities and interacting with third party apps. When a user installs a mobile payment app on a smart terminal device, the user usually stays logged in the mobile payment app or automatically logs in upon the activation of the mobile payment app. When the user installs a social media app on the smart terminal device, likewise the user remains logged in or automatically logs in upon the activation of the social media app. Therefore, all the information and content stored on the device is accessible as long as the smart terminal device is accessible. As such, the loss or unauthorized access to the personal and financial information stored on a device is of greater security concerns.

Presently, the user data security concern is addressed by configuring security setting for terminal devices. For example, a user can set up security settings on a terminal device to include blacklists to block incoming phone calls, automatically delete incoming marketing text messages, block connecting to malicious websites and the like as measurements to safeguard the data security and privacy on the terminal device.

However, the configuration of the above-described security setting is performed based on a user's own level of security concerns. Not only the procedures impose a high level of computer or device literacy upon the users, but also the security settings configured tend to be rigidly specified for a particular device, lacking in degrees of flexibility in providing mobile security.

BRIEF DESCRIPTION OF THE DRAWINGS

Various embodiments of the invention are disclosed in the following detailed description and the accompanying drawings.

In order to provide a clearer explanation of the technical schemes in embodiments of the present application, a simple introduction is given below to the drawings which are needed to describe the embodiments. Obviously, the drawings described below are merely some embodiments in the present application. Persons with ordinary skill in the art could, without expending creative effort, obtain other drawings on the basis of these drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Compared to the presently available solutions, embodiments of the present disclosure provide for advantages and improvement in providing for user data security. For example, according to various embodiments of the present disclosure, a server is configured to maintain a set of one or more security groups, each security group configured with its respective security setting information. When a terminal device is to be set up with security configurations, the terminal device sends a request to join a security group that has been configured by a trusted user and/or a trusted party, thereby configures the security settings for the terminal device accordingly. Not only it is more convenient, efficient and accurate to configure security settings on a device, but also the required level of users' computer or device literacy in order to perform security settings is lowered.

Figure 1:
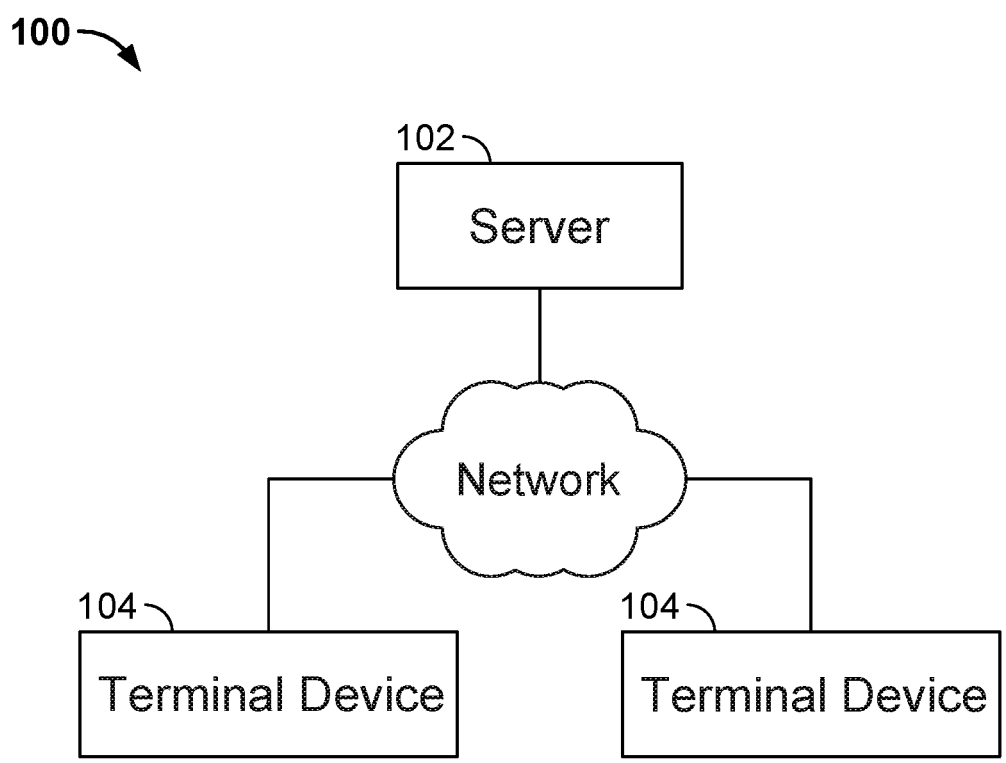
FIG. 1 is a schematic diagram illustrating an example system for configuring security settings, in accordance with one or more embodiments of the present disclosure.

FIG. 1 illustrates a schematic diagram of an example system for configuring security settings for a terminal device in accordance with an embodiment of the present disclosure. System 100 includes a server 102 configured with functionalities to create, manage and maintain security groups (not shown) associated with terminal devices 104. Example terminal devices 104 include smart phones, personal computers, tablets, wearable devices, and the like. For simplicity of illustration, only one server 102, two terminal devices 104 are shown herein. It is understood that system 100 may include any number of servers 102 as well as any number of terminal devices 104.

In this example, server 102 is configured to include one or more security groups, each security group corresponding to its respective security settings and group identification. For instance, server 102 can be configured to create and maintain a security group for a particular user. Alternatively, server 102 can also be configured to create and maintain a plurality of security groups for a particular user, with each of the security groups distinguishable according to its respective security setting information and/or group identification. Security group identifications can be implemented as, for example, a group name and/or a group ID. Security setting information can be implemented as, for example, a blacklist of blocked phone numbers, a blacklist of fraudster related phone numbers, a blacklist of malicious web sites, a database of virus definitions, a list of allowed information notification or pushing modes, privacy settings associated with apps, and the like.

Security setting information associated with a security group can be configured by professional staff, administrators, operators, or by members of the security group. For example, for an enterprise infrastructure where server 102 resides, a variety of security groups can be configured with security settings tailored to the level of security risks and concerns associated with the members of the respective security groups. It is possible to configure a baseline level of security settings for the non-management employee security group, an enhanced level of security settings for all middle-management employee security group, and most stringent security settings for the C-suit official security group. Any suitable techniques can be used to implement various level of security measurements, for example, a blacklist including only known malicious websites can be considered as a baseline security mechanism, a blacklist including suspicious websites can be considered as an enhanced security mechanism. In many cases, an IT professional performs the configurations as the IT professional is usually better equipped than the average user in terms of computer literacy and current knowledge of insecure websites, virus updates, security vulnerabilities associated with apps, accurate and convenient configuration of security settings can be achieved accordingly.

According to some embodiments of the present disclosure, a configuration interface is provided for parties who are in charge of creating and maintaining security groups and security settings associated therewith. In some embodiments, the configuration interface is provided at server 102; and in some other embodiments, the configuration interface is provided at terminal device 104. Configuration interfaces can be any suitable interfaces that allow a party to define security setting, e.g., specifying security actions associated with triggering events for various security levels. In one embodiment, the configuration interface is a graphical user interface.

Each terminal device 104 is configured to transmit security setting information and security group information to and from server 102. In operation, terminal device 104 sends the security setting information relating to the security group it creates to server 102, the details of which will be described with reference to FIG. 2. Terminal device 104 receives the security setting information relating to a security group it is joining from server 102. With the security settings deployed, terminal device 104 executes the corresponding security actions upon detecting the triggering events to protect data on the device and prevent unauthorized access to the device.

Any suitable mechanisms can be used at server 102 to manage the security settings associated with each individual member of a security group in relation to the security settings associated with the security group. For example, server 102 can adopt the policy to automatically synchronize individual member's security settings with those specified for the security group. In other words, if one member updates the security settings of his or her own, the change is incorporated into the security settings associated with the security group, and consequently the security settings are updated for the other group members accordingly. Alternatively, server 102 can adopt finer controls over how to synchronize group members' security settings with these of the security group. For instance, server may obtain approvals from a particular member before having that member's settings synchronized with changes to the security settings of the security group. Also, a member may modify his or her security settings and notify server 102 that the modification is not to be adopted into the group's security settings. An example can be found in the scenario where a group member adds a phone number to the blocking list due to personal reasons, the group member will keep this modification private as it is not necessary to share it with the remaining group members. In other words, each group member can maintain with server 102 a private record of security settings in addition to subscribing to the core security settings associated with the security group maintained by server 102.

Figure 2:
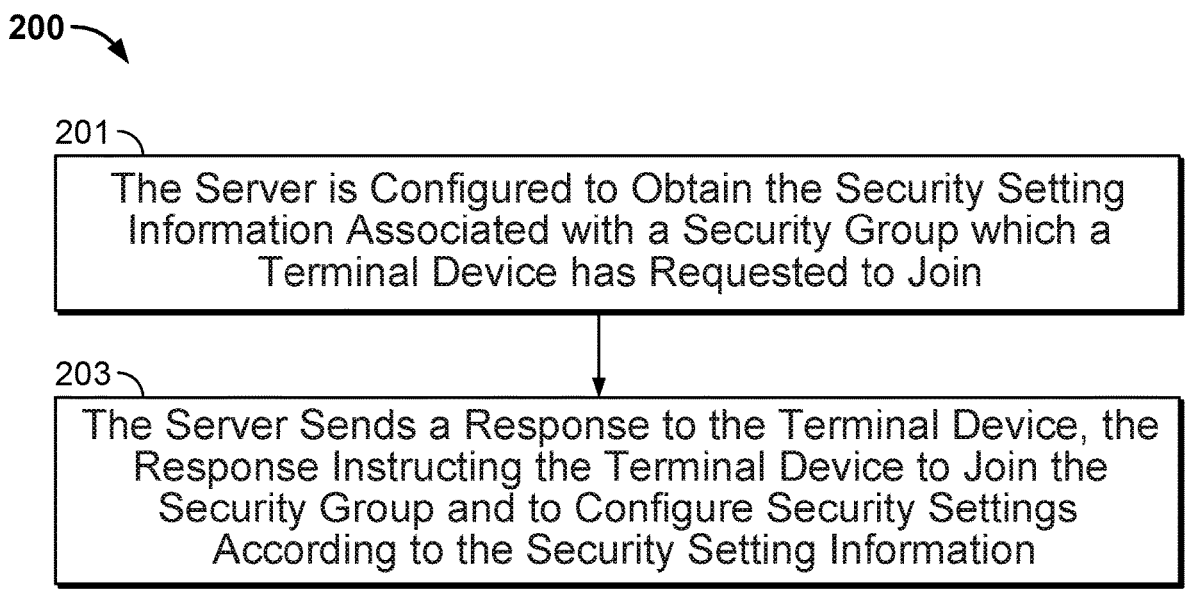
FIG. 2 is a flow chart illustrating an example process for configuring security settings, in accordance with one or more embodiments of the present disclosure.

FIG. 2 illustrates a flow chart of an example process for configuring security settings in accordance to an embodiment of the present disclosure. Process 200 can be implemented by, for example, server 102 of FIG. 1.

Process 200 starts at 201, where a server is configured to obtain the security setting information associated with a security group which a terminal device has requested to join.

At 203, the server sends a response to the terminal device, the response instructing the terminal device to join the security group and to configure security settings according to the security setting information. For example, if there are phone numbers to block on the blacklist that are not already enlisted in the security settings currently active on the terminal device, the new entries on the blacklist are added to the security settings current on the terminal device. The configuration of security settings can be performed in any suitable manner, e.g., invoking system level functions to add entries to the "Settings" widget's "Call Blocking" feature.

In some embodiments, a user at the terminal device sends a request to the server to join a security group. The joining request triggers the server to perform security setting configurations for the user at the terminal device. For example, if user A has already created security group A using terminal device A with the server, user B can configure the security settings on terminal device B by sending a request to the server to join security group A. In doing this, terminal device B is configured with security settings as specified in security group A by user A.

In some embodiments, user B who intends to configure security settings for terminal device B actively sends a request to the server to join security group A. In this scenario, as user B already knows of the existence of security group A, the request to join security group A includes the identifying information for the server to locate security group A, for example, using the identification ID of security group A itself, or the identification of user A together with other information for identifying security group A associated with user A. In some other embodiments, user B is invited by user A or terminal device A to join security group A. In this scenario, user B passively joins security group A upon accepting the invitation to join.

Furthermore, in some embodiments, terminal device A and terminal device B are located within physical vicinity to each other (e.g., the same geo-area). For example, both terminal device A and terminal device B are associated with the same local area network or the same regional telecommunication network. In some other embodiments, terminal device A and terminal device B are not located within physical vicinity to each other (e.g., in different geographical areas). For example, terminal device A, used by a family's grown-up child working in Beijing, and terminal device B, used by the child's parents living in Hangzhou, are not associated with the same local area network or the same regional telecommunication network.

Upon receiving the join request sent by terminal device B, the server is triggered to look up security group A. The information of security group A can be obtained either locally or from a remote database or another server configured to maintain the information associated with the definition of security group A. The information of security group A is used by the server to obtain the security settings configured in security group A.

Alternatively, without the terminal device actively sending a request to join or being invited to join a security group, the server can first detect the existence of a context associated with the terminal device (e.g., a particular geo-location). Then, the server determines whether there are security settings configured to correspond to the context. If so, the server adds the terminal device to the security group associated with the security settings corresponding the context. In some embodiments, the server sends an invite to join the security group associated with the security settings to the terminal device, prompting the user of the terminal device to choose whether or not to join the security group identified by the server. If an affirmative response is received, the server adds the terminal device to the security group.

According to various embodiments of the present disclosure, three mechanisms to detect whether a terminal device is at a particular context are described in the following. It is understood that any suitable context-determining mechanisms can be applied herein without limitation.

First, the server acquires the context-determining information associated with the terminal device. The terminal device can be associated with context-determining information corresponding to contexts such as, location context, user status related context (e.g., user's motion status), contexts detected on the terminal device (e.g., temperature, IoT signals), etc. Based on the acquired context-determining information, the server determines the existence of contexts for the terminal device.

Second, the server receives context-determining information reported from the terminal device, and thereby determines the existence of contexts for the terminal device based on the context-determining information. The context-determining information can include those as described above.

Third, the terminal device itself determines its own contexts based on its context-determining information. For example, the terminal device can decide that it is located at a mall, a coffee shop or an office building by analyzing its own GPS data. Afterwards, the terminal device reports the determined contexts to the server. Using this mechanism, the server receives the contexts associated with the terminal device directly.

With the contexts associated with the terminal device available, the server in turn determines the security settings corresponding to the contexts, the security settings configured to correspond to a security group. As the group is determined based on the contexts associated with the terminal device, the security group is considered as the security group the terminal device is permitted to or intends to join.

In some embodiments, the server is configured to, prior to sending a join response to the terminal device, determine whether the terminal device is authorized to join the security group. As such, prior to 202, the server has the option to assess whether to permit the terminal device to join the security group that is to be joined by the terminal device.

According to various embodiments of the present disclosure, three mechanisms to determine whether a terminal device is permitted to join a particular security group are described in the following. It is understood that any suitable determining mechanisms can be applied herein without limitation.

First, if the request to join sent from the terminal device includes a security group identifier, and if the server is able to look up the included security group, the server permits the terminal device to join the security group requested.

Second, if a member of a security group invites, via the server, the terminal device to join the security group, upon receiving the request to join sent by the terminal device, the server permits the terminal to join the security group. Alternatively, upon receiving the response from the terminal device accepting the invite from the member, the server also permits the terminal device to join the security group.

Third, the server queries at least one member of the security group which the terminal device requests to join for approval. If at least one member approves of the terminal device to join, the server permits the terminal device to join the security group requested. Taking the above-described scenario involving terminal device A and terminal device B for example, the present members of security group A includes terminal A and terminal C. The server queries both terminal device A and terminal device C in terms of approving or disapproving terminal device B to join security group A. If both approve, the server permits terminal device B to join security group A. Or, the server chooses to only query only terminal device A, which created security group A. If terminal device A approves of the terminal device joining security group A, the server in turn permits terminal device B to join security group. Or, the server selects members from those who have successfully joined security group A to query for approval of terminal device B joining security group A. Again, the server permits terminal device B to join security group A if the selected members approve.

It should be noted that, in addition to the example illustrated with reference to FIG. 2 in which security settings are obtained prior to the determination of whether the terminal device is permitted to join the security group associated with the security settings, the order between the two actions can be switched. For example, it can be first determined whether the terminal device is permitted to join a particular security group, then the corresponding security settings can be obtained and applied to the terminal device. For another example, the determination of whether to permit the terminal device to join the security group and the obtaining of security setting information associated with the security group can be performed at the same time or substantially the same time.

At the step where the server determines whether to permit the terminal device to join the security group, the identification information of the terminal device can be included in the request to join sent to the server by the terminal device.

At 203, the server sends a response to the terminal device, the response instructing the terminal device to join the security group and thereby configure the security settings according to the security setting information specified by the security group.

In the scenario where the server is able to look up the security group that the terminal has requested to join with success, the server in turn permits the terminal to join the requested security group. Further, the server transmits a response to the request to the terminal, and thereby instructs the terminal to complete the configuration of the security settings accordingly.

According to various embodiments of the present disclosure, two mechanisms to configure a response to the request are described in the following. It is understood that any suitable configuration mechanisms can be applied herein without limitation.

First, a response to the request to join includes security setting information corresponding to the requested security group. After receiving the response, the terminal configures its security settings according to the security setting information included in the response. In some embodiments, the terminal device replaces its current security settings with the ones specified in the response.

Second, a response includes only the information relating to the differences between the security settings currently configured at the terminal device and those specified for the requested security group. In this scenario, upon being triggered, the server obtains the current security settings for the terminal device, and compares with the security settings configured for the requested security group. As such, the differences in terms of two sets of security settings are obtained by the server. Any suitable mechanisms can be utilized by the server to retrieve the security settings currently configured at the terminal device. For example, the terminal device can be configured to transmit it present active security settings to the server along with its request to join the security group. Alternatively, the server can exchange information with the terminal device to query for the security settings current in force at the terminal device. After receiving the security settings that are specified differently in the security setting information corresponding to the requested security group, the terminal device configures its security settings accordingly. For example, the terminal device can update its current settings with replacement security actions relating to the triggering events, add new security actions relating to the triggering events, or delete the entries in the current security settings so that the previously triggering events no longer invoke security measures. As such, the data payload of the response can be reduced for the purpose of decreasing the amount of resource usage required to transmit such a response.

Taking the blacklist of harassing-calls related telephone numbers for example, the requested security group has in its security settings configured 100 entries of such phone numbers. On the other hand, the terminal device is presently configured with 60 entries of such phone numbers. The server compares these two blacklist of phone numbers and obtains at least 40 entries of the phone numbers for inclusion in the response. The reason there are at least 40 phone numbers is that the 60 entries currently configured on the terminal device may or may not exist in the blacklist configured for the security group. By receiving the response from the server, the terminal device thereby updates its current blacklist in the security settings by use of at least 40 phone numbers. In this way, the terminal device blacklists all the entries enlisted for the security group.

Taking the blacklist of fraudsters related phone numbers for example, the requested security group has configured 15 entries of fraudsters' phone numbers in its security settings. On the other hand, the terminal device has none specified with its current security settings. The server compares these two blacklists and includes the entire blacklist of the 15 entries in the response transmitted to the terminal device. After receiving the response, the terminal device creates a blacklist of fraudsters and populates the newly created blacklist with the 15 entries included in the response.

Taking the database of viruses for example, the requested security group has configured its virus database as current as of Mar. 12, 2015. On the other hand, the terminal device has configured its virus database with the latest update as of Feb. 28, 2015 in its security settings. The server compares the information relating to the definition of the two virus databases and determines the difference as the newly defined viruses during the two afore-mentioned dates for inclusion in the response to the terminal device. Upon receiving the response, the terminal device updates its current virus database definition with the difference included therein. Alternatively, the server can send only the current data information associated with the database of the security group such that the terminal device can bring its virus database definition updated to that specific date.

If the server is not able successfully locate the security group which the terminal device has requested to join, or if the server determines that the terminal device is not permitted to join the requested security group, the server notifies the terminal device of the failure to join the requested security group. In addition, the server has the option to further notify the terminal device of the reasons why the terminal device fails to join the requested security group, e.g., because of the requested security group not being found, or the lack of authorization for the terminal device to join the requested group.

In sum, when a user of a terminal device intends to configure security settings for the terminal device, the user no longer needs to set up each of the security settings one by one. Instead, the user only needs to identify a trustworthy user, and thereby joins the security group created by the trustworthy user. The user subsequently configures the security settings specified by the security group. As such, not only the operation to configure security settings becomes more efficient to perform, but also the requirement of computer literacy for the user is lowered due to the ease at which a terminal device can be configured with security settings despite the complexity of security concerns and solutions given rise by the modern age of ubiquitous computing.

Furthermore, if the security setting information includes a blacklist of harassing-calls related telephone numbers or a blacklist of fraudsters related telephone numbers, a terminal device that has already joined a security group adds an entry of a telephone number to the blacklists upon receiving a telephone call which turns out to be a harassing call, a telemarketing call, or a call originated by a fraudster. In some embodiments, with the assistance of pertinent apps, phone numbers associated with such unwanted calls can be identified and thereby added to the blacklists specified in the security group.

Similarly, if the security setting information specifies a virus database, the terminal device that has already joined the security group may get online to update the virus database definition.

If the security setting information specifies a blacklist of malicious networks, the server receives an authentication request from a terminal device which has joined the security group. The authentication request includes the web address obtained by the terminal device through the network it currently logs onto. The server determines whether the web address is a secure web address. If not, the server determines the network as a malicious network, and adds the network to the corresponding blacklist recording the malicious websites.

For example, a user at a terminal device is accessing unknown networks in a public place (e.g., a café shop). Two Wi-Fi networks are both accessible to the user, one being a public Wi-Fi network deployed by the café shop, the other a public Wi-Fi network deployed and owned privately by a malicious party. If the user connects the terminal devices to the second public Wi-Fi network to access legitimate websites (e.g., the Taobao website), the user is exposed to the risk of the malicious party directing the terminal device to malicious websites (such as a phishing website mimicking the Taobao website). In this scenario, the terminal device includes the web address directed to by the Wi-Fi network in the authentication request, and requests the server to perform a security authentication of the included website. Only if the server authenticates the website as a legitimate address, the second terminal device goes on to access the website directed to by such a Wi-Fi network.

In addition, the server may also add the Wi-Fi network to a whitelist of trusted public Wi-Fi networks. In this way, when the user or other members of the same security group connects to the same Wi-Fi network, the server is no longer requested to conduct security authentication on the Wi-Fi network again, conserving the computing resources at the server and the transmission-related resources at networks. On the other hand, if the web address directed to by the Wi-Fi network is determined as an insecure web address, the server sends to the second terminal device a warning alert, and adds the Wi-Fi network the blacklist of malicious networks. The members of the same security group then are able to use the updated blacklist to avoid connecting to this Wi-Fi network. Thus, security measures are provided to all the members of the security group against the Wi-Fi network based on one instance of one member encountering a malicious website.

In some embodiments, the security setting information of the security group specifies a blacklist of insecure networks, and the server is also configured to intercept data packets received by the terminal device at the network to which the terminal device currently connects. The server determines whether the intercepted data packs are secure data packets by, for example, examining the header information of the data packets to determine whether they are part of denial of service attacks or the like. If not, the server determines the network as a malicious network and adds the network to the corresponding blacklist of malicious networks. Taking the above-described scenario for example again, the user at the terminal device needs to connect to unknown networks in a public place (e.g., a coffee shop). After detecting that the terminal device connects to the public Wi-Fi network hosted by a private party (e.g., a Wi-Fi not operated by the coffee shop), the server actively intercepts data packets sent by the Wi-Fi network to the terminal device, and thereby performs authentication checks for the Wi-Fi network. Based on the result of such authentication checks, the server either adds the Wi-Fi network to the blacklist of malicious networks upon a failed authentication, or allows the user to continue to access the Wi-Fi network as a legitimate site.

In some embodiments, the security setting information specifies allowed modes to push information to the user, and the terminal device that has already joined to the security group can set the modes to allow pushed information based on particular contexts. For example, in the context that the user is at an airport, the allowed modes let the promotional information relating to flight tickets, hotels, tourism, and the like being pushed to the user. Taking airline boarding information for example, the user starts to receive, in SMS messages or the app associated with the airline with which the user is travelling, the notice of gate information, gate changing information and the like. In the context that the user is not at an airport, the allowed modes disallow the afore-mentioned information to reach the user. For another example, in the context that the user is at a department store, the allowed modes let the information relating to the product promotions, sales, and the like being pushed to the user. In the context that the user is not at a department store, the allowed modes disallow the afore-mentioned information to reach the user. For yet another example, in the context that the user is at the office, the allowed modes let the information relating to work, e.g., the location information relating to employees' whereabouts during work hours being pushed to the user. In the context that the user is not at the office, the allowed modes disallow the afore-mentioned information to reach the user.

Any suitable context-determining mechanisms can be applied herein to obtain the contexts which a user is currently experiencing for purposes of the server to configure corresponding security settings for the user at a terminal device. For example, the server can detect the contexts associated with a user by collecting data from the terminal device. Such data includes, for example, voice commands, images, photos, other visual cues, location information, on-device sensor information, data received at the terminal device, data generated by apps on the terminal device or other Internet of Things (IoT) devices, and the like. Further, the server is configured to use any combinations of the afore-described data to detect the contexts relating to the user at the terminal device. With the context information determined, the server configures mapping between the allowed modes to push information onto the terminal device and the contexts under which such information can be allowed to reach the user. In this way, the allowance of pushed information is configured based on particular contexts.

In some embodiments, the security setting information specifies access rights of apps. Here, the server receives requests from the terminal device to configure security settings for particular apps. In some embodiments, the server configures this aspect of security control in terms of the access rights of other apps during the execution of the particular app under configuration. The access rights can be configured as, for example, no access to any data on the device, or no access to some data specified by the terminal. In some other embodiments, the access right can also be specified as how a particular app can access the data on the device. For example, the access rights for the Wechat® app can be configured in terms of whether Wechat® is allowed to access the apps of photos, phone contacts, and the like. For further purposes of security controls, in some embodiments, the server checks whether the app is associated with a security clearance level no lower than a preset one. In other embodiments, the server checks whether the app is enlisted on the whitelist of apps designated by the terminal device. In implementations, the server can configure the access rights for the app based on the default security settings or based on the request for security configuration sent from the terminal device. For example, the server can configure the access right for a mobile payment app as, during the execution of the mobile payment app, no other apps are allowed access to the data included in text messages. In this way, the security settings prevent other apps from accessing the information such as payment verification codes that are typically transmitted during the mobile payment process via text messages.

It should be noted that the terminal device can be a member that has already joined a security group, or the member who created the security group. After joining a security group, a terminal device can also be configured to obtain security setting information in the afore-described manner. In addition, the terminal device can update, under various circumstances, the security settings relating the security group in the afore-described manner.

Presently available techniques for configuring security setting lacks the ability to configure or update the existent configuration of security settings in a timely, dynamic and specific manner. Embodiments of the present disclosure address this technical problem by, among other things, providing for the configuring of the security settings based on context information or environmental information. As a result, in addition to other advantages made available, the degree of flexibility to configure security settings is increased. In some embodiments, the server is configured to store mappings between the security settings and their correspondent contextual or environmental information. Upon receiving a transitioning request that includes the contextual or environmental information sent by a member of a security group, the server, in response to the request, transitions the security setting information configured for the member to the security setting information mapped to the received contextual or environmental information.

For instance, terminal device A detects that its location as being at an airport. Upon obtaining this location information from terminal device A, the server transitions the security setting information configured for terminal device A to the settings that allows for receiving pushed information relating to hotel reservation and air ticket book, etc. For another example, terminal device B, used by a family member (e.g., the parent of the family), detects that the family member lives in a city different than the other family member (e.g., the location information indicates that terminal device B is in Hangzhou, and the location information indicates that terminal device A used by the other family member (e.g., the grown-up child of the family) is in Beijing). Based on this information, the server determines that the two terminal devices are located in different geo-areas, and transitions the security setting information for terminal B to the settings that turn on the blocking of the harassing call related telephone numbers in the blacklist and the fraudster related telephone numbers in another blacklist.

Figure 3:
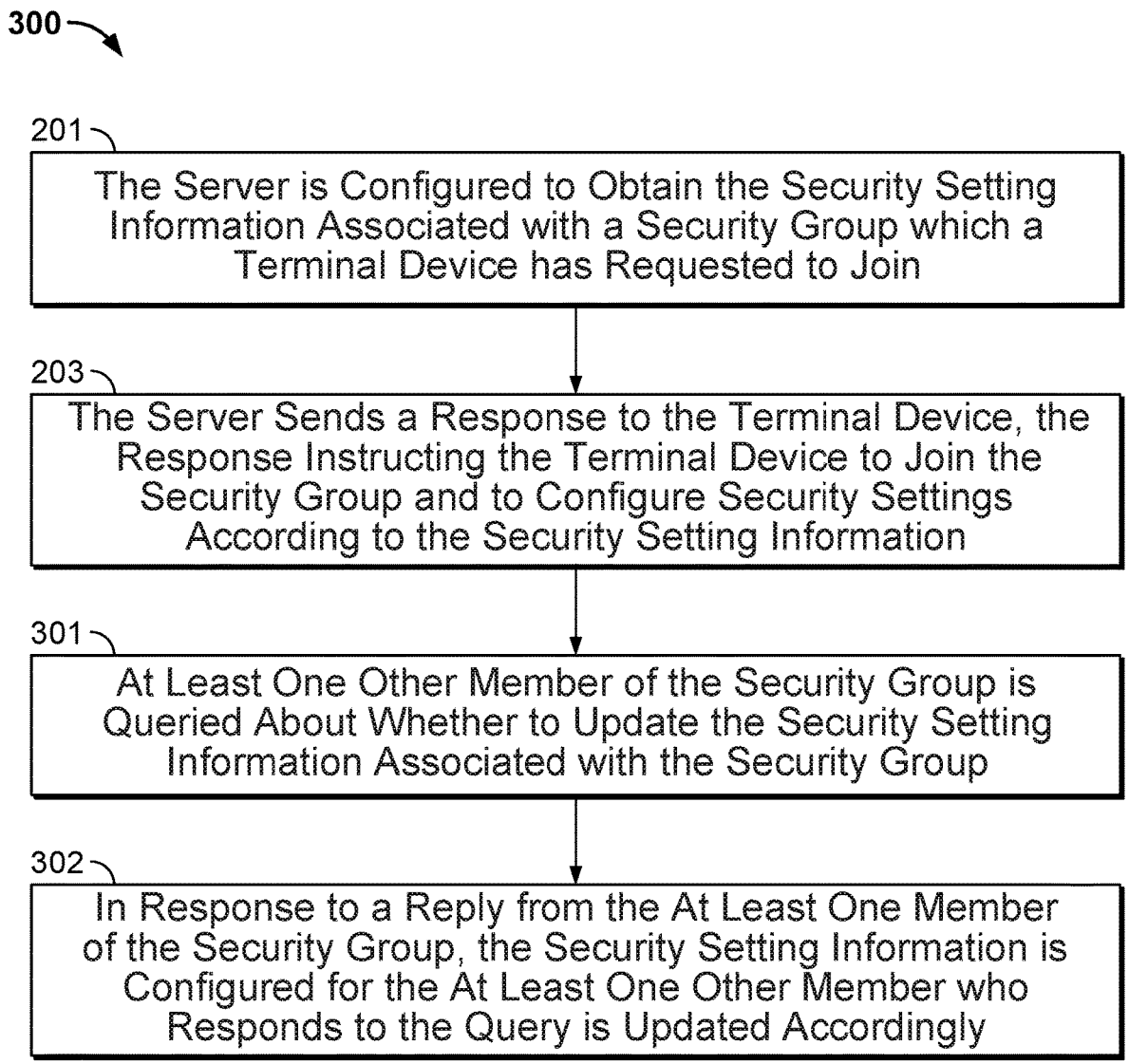
FIG. 3 is a flow chart illustrating another example process for configuring security settings, in accordance with one or more embodiments of the present disclosure.

FIG. 3 illustrates another example process for configuring security settings in accordance with an embodiment of the present disclosure. As shown herein, process 300 is executed post to process 200 of FIG. 2. At 301, at least one other member of the security group is queried about whether to update the security setting information associated with the security group.

At 302, in response to a reply from the at least one member of the security group, the security setting information is configured for the at least one other member who responds, based on the updated security settings. In other words, the affirmative response to the query sent at 201 results in the security setting information being updated for the group member who sends such approval response to the server.

In this way, if a member of the security group updates the security setting information configured under the security group to address various scenarios and circumstances, the server can control how and whether the other members of the same security group are to have their security settings synchronized with the security setting information modified or updated by one member of the security group. In one example, a member of the security group can modify the security settings by adding harassing call related telephone numbers, fraudster related telephone numbers, malicious networks or web sites to their respective blacklists associated with the security group, updating the virus database, adjusting or adding push modes allowing new information to reach the user, deleting access right provisions for apps, and the like. As such, it is under the server's control how a member of the security group can have the security settings synchronously updated using the changes to another member's newly configured security settings. In one case, the server can update all the other members of the security group with the changes entered by one member of the security group. In another case, the security setting information of a member of the security group is only synchronized with the changes entered by other members of the group if the server receives an approval from such user. For those members who don't respond with an approval, the server keeps their respective security settings associated with the security group unchanged.

In some embodiments, the other members of the security group can be members who have not yet updated the respective security settings. For example, terminal device A, terminal device B and terminal device C are members to the same security group. If terminal device A updates its security setting information such as adding new harassing call related telephone numbers to the blacklist, then terminal device B and terminal device C are regarded as the other members. If both terminal device A and terminal device B have updated their respective security setting information such as updating a virus database definition, then terminal device C is regarded as the other member.

Figure 4:
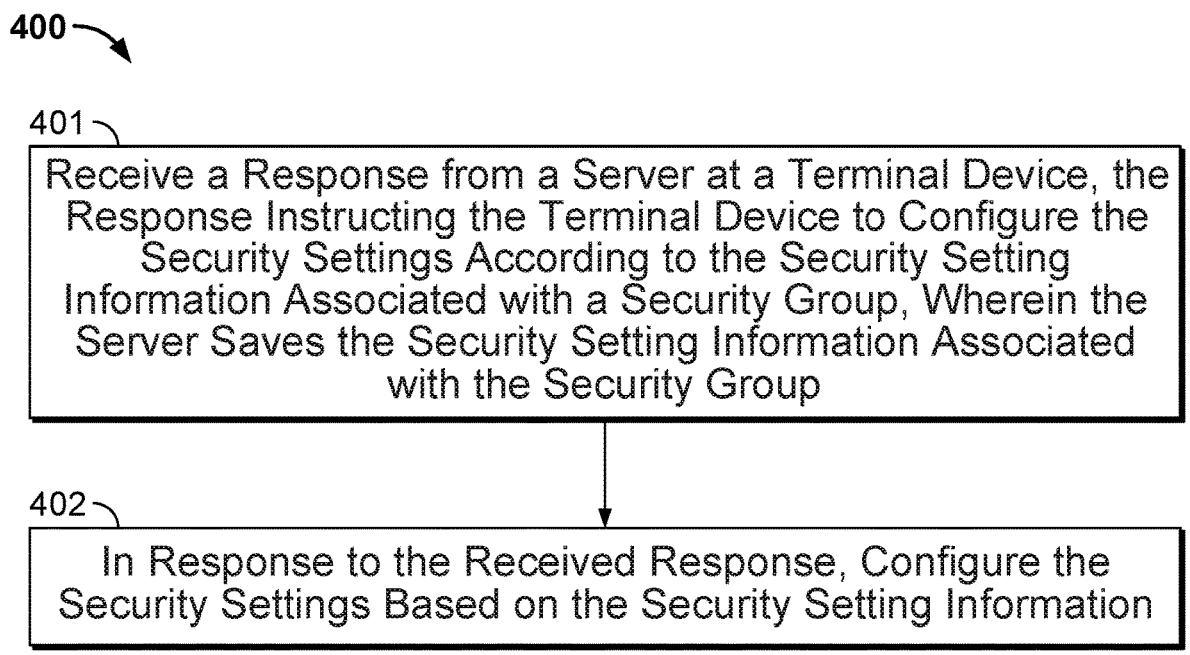
FIG. 4 is a flow chart illustrating yet another example process for configuring security settings, in accordance with one or more embodiments of the present disclosure.

FIG. 4 illustrates yet another example process for configuring security settings in accordance with an embodiment of the present disclosure. Process 400 can be implemented by, for example, terminal devices 104 of FIG. 1.

Process 400 starts at 401, where a terminal device receives a response from a server to which the terminal device has sent a request to join a security group. The response is configured to instruct the terminal device to configure its security settings according to the security setting information associated with the security group. The server is configured to store the security setting information corresponding to the security group.

At 402, the terminal device configures its security settings based on the security setting information.

In some embodiments, a server is configured to manage and maintain a plurality of security groups, each of which is configured with its respective security setting information as well as its respective identification information. For example, the server can create and manage a security group for a particular user, or a plurality of security groups for a particular user. In the case where there are multiple security groups associated with one user, each of such security groups is distinguishable based on the respective group identification information and/or the respective security settings associated therewith. In implementations, the identification information of a security group can be configured as, for example, a group title and/or a group ID. The security settings associated with the security group can be configured as, for example, a blacklist of harassing call related telephone numbers, a blacklist of fraudster related telephone numbers, a blacklist of malicious networks, a virus database, allowed modes of pushed information, and the like. According to various embodiments of the present disclosure, the security setting information can be specified by professional security personnel, an operator, an administrator, or by members of the security group.

In some embodiments, the request sent by the terminal device to join a security group includes the information to identify the requested security group. In this way, the user of the terminal device sends a request to join to the server such that the server is triggered to configure security settings for the user at the terminal device. For example, user A first creates security group A from terminal device A. When user B intends to configure security settings at terminal device B, user B can send a request to the server to join security group A created by user A. As such, user B is able to configure security settings for terminal device B utilizing the security setting information configured by user A for security group A. In this example, the request from user B to the server can include the identifying information of security group A. For another example, the request can indicate the requested security group as the most recent security group created by user A, the security group created by user A for staying at or visiting a particular geo-area, or the security group created by user A that has named user B as a permissible potential member thereof.

Again, terminal device A and terminal device B may be located in the same geo-area, e.g., both being customers of the same local area network or regional telecommunication network. Alternatively, terminal device A and terminal device B may be located in different geo-areas, e.g., terminal device A used by one family member working in Beijing, and terminal device B used by another family member living in Hangzhou.

Upon receiving the request to join security group A sent from terminal device B, the server is triggered to look up security group either locally or from a backend database such as a cloud storage. After locating the record of security group A, the server obtains the security setting information configured for security group A.

In some embodiments, prior to the terminal device receiving from the server a response to the request, the terminal device is configured to receive an invite to join from the server, the invite instructing the terminal device to join the security group. In some embodiments, if the terminal device sends a confirmation to the server in response to the invite from the server, then the terminal receives from the server a response to the request.

In general, when the terminal device receives an invite to join a security group, the server has determined that the terminal device is at the contexts (e.g., user's location) that matches those specified for the security group that the terminal device is being invited to join. For example, the server invites the terminal device to join respective security groups based on the detection of the user being at a movie theater, a coffee shop, at the office during work hours, and the like. The user at the terminal device can be allowed to choose whether to join the security group. If the user consents to joining the security group, the security settings at the terminal device are configured according to the security setting information associated with the security group.

Regarding the subsequent security actions executed based on the security settings configured according to the security group, correspondent security measures are performed according to various security settings deployed in force. When the security settings include a blacklist of malicious websites, the terminal device blocks the access to those enlisted malicious websites according to the blacklist. Alternatively, the terminal device recognizes a websites as insecure based on the entries on the blacklist, and thereby intercepts the access to the website. Or, the terminal device intercepts data packets received from the malicious or insecure networks on the blacklist. Also, the terminal device can recognize data packets received from insecure networks based on the entries on the blacklist, thereby intercepts those data packets.

For example, a Wi-Fi network is enlisted on the blacklist of the security settings. After configuring its security settings according to the security group, the terminal device detects the Wi-Fi network on the blacklist and thereby disallow connection to the Wi-Fi network. When the user at the terminal device accesses a website on the blacklist of the security settings, the terminal device intercepts such access, and alerts the user with a warning message. Further, in case the user accidently connects the terminal device to a malicious website or Wi-Fi network, the terminal device nevertheless intercepts the data packets transmitted from the malicious websites or the Wi-Fi network.

For another example, the security setting information specifies allowed modes for pushed information. The terminal device allows information pushed thereto to reach the user according to the allowed mode configured for the contexts of the terminal device.

For example, in the context that the user is at an airport, the allowed modes let promotional information relating to flight tickets, hotels, tourism, and the like being pushed to the user. In the context that the user is not at an airport, the allowed modes disallow the afore-mentioned information to reach the user. For another example, in the context that the user is at a department store, the allowed modes let the information relating to the product promotions, sales, and the like being pushed to the user. In the context that the user is not at a department store, the allowed modes disallow the afore-mentioned information to reach the user. For yet another example, in the context that the user is at the office, the allowed modes let the information relating to work, e.g., the location information relating to employees' whereabouts during work hours being pushed to the user. In the context that the user is not at the office, the allowed modes disallow the afore-mentioned information to reach the user.

In some embodiments, the security setting information specifies access rights of apps. Here, the server receives requests from the terminal device to configure security settings for particular apps. In some embodiments, the server configures this aspect of security control in terms of the access rights of other apps during the execution of the particular app under configuration. The access rights can be configured as, for example, no access to any data on the device, or no access to some data specified by the terminal. In some other embodiments, the access right can also be specified as how a particular app can access the data on the device.

When the server locates the security group requested by the terminal device to join, and the server determines that the terminal device is allowed to join the requested security group, and the server sends a response to the terminal device, the response instructing the terminal device to join the requested security group. According to various embodiments of the present disclosure, any suitable techniques can be used to implement the response without limitation, and the following illustrates two example implementations.

First, the response includes security setting information corresponding to the requested security group. After receiving the response, the terminal configures its security settings according to the security setting information included in the response. In some embodiments, the terminal device replaces its current security settings with the ones specified in the response.

Second, the response includes only the information relating to the differences between the security settings currently configured at the terminal device and those specified for the requested security group. In this scenario, upon being triggered, the server obtains the current security settings for the terminal device, and compares with the security settings configured for the requested security group. As such, the differences in terms of two sets of security settings are obtained by the server. Any suitable mechanisms can be utilized by the server to retrieve the security settings currently configured at the terminal device. For example, the terminal device can be configured to transmit its present active security settings to the server along with its request to join the security group. Alternatively, the server can exchange information with the terminal device to query for the security settings current in force at the terminal device. After receiving the security settings that are specified differently in the security setting information corresponding to the requested security group, the terminal device configures its security settings accordingly. For example, the terminal device can update its current settings with replacement security actions relating to the triggering events, add new security actions relating to the triggering events, or delete the entries in the current security settings so that the previously triggering events no longer invoke security measures. As such, the data payload of the response can be reduced for the purpose of decreasing the amount of resource usage required to transmit such a response.

Figure 5:
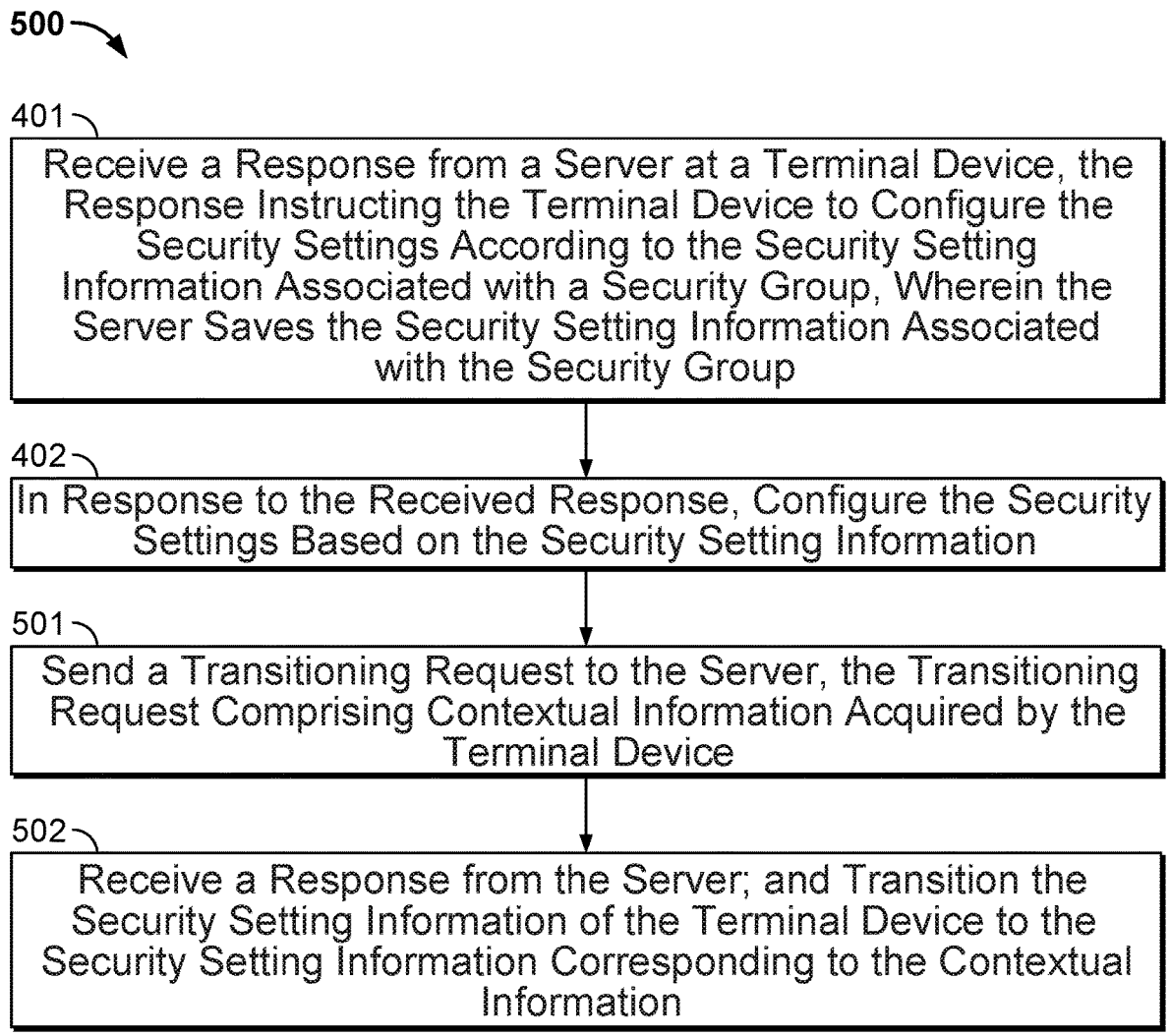
FIG. 5 is a flow chart illustrating still yet another example process for configuring security settings, in accordance with one or more embodiments of the present disclosure.

FIG. 5 illustrates still yet another example process for configuring security settings in accordance with an embodiment of the present disclosure. Process 500 can be implemented by, for example, terminal devices 104 of FIG. 1. As shown herein, process 500 repeats the steps 401 and 402 of FIG. 4 in the beginning.

Afterwards, process 500 continues to 501, where the terminal device sends a transitioning request to the server, the transitioning request including the contextual information acquired by the terminal device.

At 502, the terminal device receives a response to the transitioning request from server, and, transitions the security settings on the terminal device to the security setting information corresponding to the contextual information based on the response.

For example, when the terminal device detects the contexts as the user at the terminal device being at a hotel, the server transitions the security settings configured at the terminal device to the one that allows information pushed from the hotel to reach the user. For instance, terminal device A detects that its location as being at an airport. Upon obtaining this location information from terminal device A, the server transitions the security setting information configured for terminal device A to the settings that allows for receiving pushed information relating to hotel reservation and air ticket book, etc. For another example, terminal device B, used by one family member, detects that this family member lives in a city different than another family member (e.g., the location information indicates that terminal device B is in Hangzhou, and the location information indicates that terminal device A used by the other family member is in Beijing). Based on this information, the server determines that the two terminal devices are located in different geo-areas, and transitions the security setting information for terminal B to the settings that turn on the blocking of the harassing call related telephone numbers in the blacklist and the fraudster related telephone numbers in another blacklist.

Figure 6:
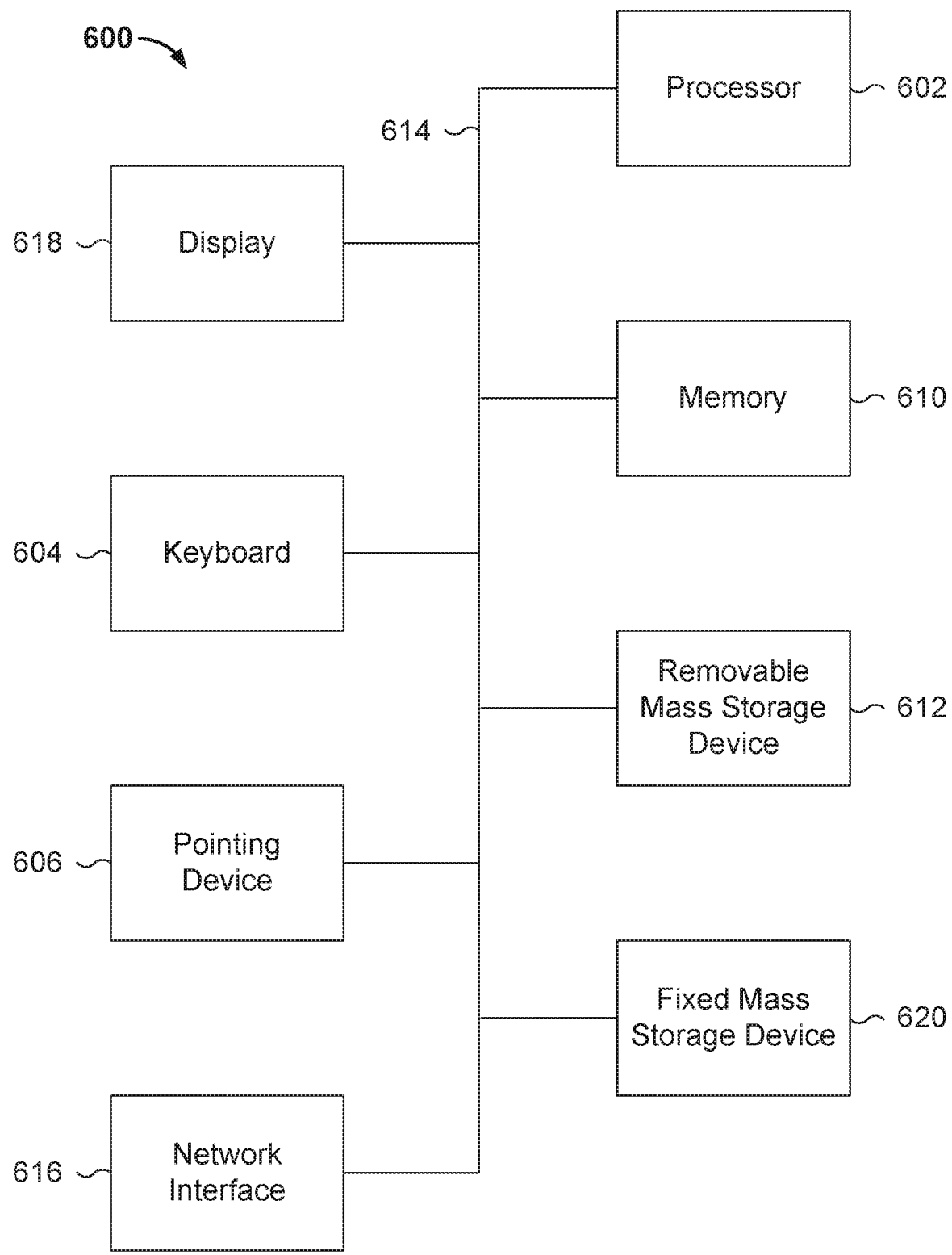
FIG. 6 is a functional diagram illustrating an embodiment of a programmed computer system for implementing the configuration of security settings, in accordance with one or more embodiments of the present disclosure.

FIG. 6 is a functional diagram illustrating an embodiment of a programmed computer system for implementing the configuring of security settings. As will be apparent, other computer system architectures and configurations can be used to configure security settings. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618). In some embodiments, processor 602 includes and/or is used to provide the launch of a client application based on a message.

Processor 602 is coupled bi-directionally with memory 610, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer readable storage media, described below, depending on whether, for example, data access needs to be bi-directional or uni-directional. For example, processor 602 can also directly and very rapidly retrieve and store frequently needed data in a cache memory (not shown).

A removable mass storage device 612 provides additional data storage capacity for the computer system 600 and is coupled either bi-directionally (read/write) or uni-directionally (read only) to processor 602. For example, storage 612 can also include computer readable media such as magnetic tape, flash memory, PC-CARDS, portable mass storage devices, holographic storage devices, and other storage devices. A fixed mass storage 620 can also, for example, provide additional data storage capacity. The most common example of fixed mass storage 620 is a hard disk drive. Mass storage 612, 620 generally store additional programming instructions, data, and the like that typically are not in active use by the processor 602. It will be appreciated that the information retained within mass storages 612 and 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display 618, a network interface 616, a keyboard 604, and a pointing device 608, as well as an auxiliary input/output device interface, a sound card, speakers, and other subsystems as needed. For example, the pointing device 608 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers. Persons skilled in the art may clearly understand that, for the sake of descriptive convenience and streamlining, one may refer to the processes in the aforesaid method embodiments that correspond to specific work processes of the systems, devices, and units described above. They will not be discussed further here.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, (transitory media), such as modulated data signals and carrier waves.

A person skilled in the art should understand that the embodiment of the present application can be provided as methods, systems, or computer software products. Therefore, the present application may take the form of complete hardware embodiments, complete software embodiments, or embodiments that combine software and hardware. In addition, the present application can take the form of computer program products implemented on one or more computer-operable storage media (including but not limited to magnetic disk storage devices, CD-ROMs, and optical storage devices) containing computer operable program codes.

The above-described are merely embodiments of the present application and do not serve to limit the present application. For persons skilled in the art, the present application may have various alterations and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for configuring security settings, comprising:
receiving, at a server, a request to join a security group from a first terminal device, the request comprising a security group identifier;
obtaining, by the server, security setting information associated with the security group;
sending a response to the first terminal device, the response including security setting information associated with the security group and instructing the first terminal device to join the security group and to configure security settings according to the included security setting information, wherein the first terminal device is associated with a first member of the security group;
in response to receiving an update to the security setting information of the security group from a second terminal device associated with a second member of the security group, querying, by the server, the first terminal device associated with the first member of the security group whether to update security setting information for the first terminal device, wherein the second member is different from the first member, wherein the second terminal device is different from the first terminal device; and in response to a reply sent by the first terminal device to indicate an approval of updating by the first member, updating the security setting information for the first member.

2. The method of claim 1, further comprising:
obtaining contextual information relating to the first terminal device; and
determining the security group based on the obtained contextual information.

3. The method of claim 2, further comprising:
sending an invitation to the first terminal device, the invitation configured to invite the first terminal device to join the security group; and
wherein the response is sent to the first terminal device in response to receiving a reply confirming joining the security group from the first terminal device.

4. The method of claim 1, further comprising:
determining whether to permit the first terminal device to join the security group; and
wherein the response is sent to the first terminal device in response to a determination permitting the first terminal device to join the security group.

5. The method of claim 4, wherein the determination of whether to permit the first terminal device to join the security group comprises:
in response to the request from the second terminal device, sending an invitation to the first terminal device to join the security group, the invitation comprising an identifier for the security group; and
in response to a determination that the first terminal device receives the invitation to join the security group, permitting the first terminal device to join the security group.

6. The method of claim 4, wherein the determining of whether to permit the first terminal device to join the security group comprises:
querying at least one other member of the security group to determine whether to permit the first terminal device to join the security group; and
permitting the first terminal device to join the security group in response to the determination that the at least one other member permits the first terminal device to join the security group.

7. The method of claim 1, wherein:
the response comprises the security setting information or differences of security settings, wherein the differences of security settings are obtained by comparing the security setting information associated with the security group with security setting information currently configured at the first terminal device.

8. The method of claim 1, wherein the security setting information comprises a blacklist, and wherein the security setting information is obtained by:
receiving an authentication request from the second terminal device, the authentication request comprising a web address obtained by the second terminal device through a network the second terminal device is currently accessing;
determining whether the web address is secure;

in response to the determination that the web address is insecure, designating the network as an insecure network; and
adding the network to the blacklist.

9. The method of claim 1, wherein the security setting information comprises a blacklist, and wherein the security setting information is obtained by:
intercepting data packets received by the second terminal device via a network that the second terminal device is currently accessing;
determining whether the data packets are secure;
in response to the determination that the data packets are insecure, designating the network as an insecure network; and
adding the network to the blacklist.

10. The method of claim 1, wherein the security setting information comprises allowed modes for pushed information, and wherein the security setting information is obtained by:
receiving contextual information and corresponding allowed modes from the second terminal device, and the contextual information comprising voice information, image information, location information, or any combinations thereof;
determining a context which the second terminal device is at according to the contextual information; and
setting a mapping between the allowed modes and the context.

11. The method of claim 1, wherein the security setting information comprises access rights associated with applications, and wherein the security setting information is obtained by:
receiving a request from the second terminal device for configuring a designated application; and
configuring access rights for at least one other application when the designated application is executing, the at least one other application being an application other than the designated application.

12. The method of claim 1, wherein mappings between the security setting information and contextual information are stored, and the method further comprising:
in response to a transitioning request that includes contextual information from a third member of the security group, transitioning security setting information of the third member to security setting information corresponding to the contextual information based on the mappings.

13. A system for configuring security settings, comprising:
one or more hardware processors configured to:
receive, at a server, a request to join a security group from a first terminal device, the request comprising a security group identifier;
obtain, by the server, security setting information associated with the security group;
send a response to the first terminal device, the response including security setting information associated with the security group and instructing the first terminal device to join the security group and to configure security settings according to the included security setting information, wherein the first terminal device is associated with a first member of the security group;
in response to receiving an update to the security setting information of the security group from a second terminal device associated with a second member of the security group, query, by the server, the first terminal device associated with the first member of the security group whether to update security setting information for the first terminal device, wherein the second member is different from the first member, wherein the second terminal device is different from the first terminal device; and in response to a reply sent by the first terminal device to indicate an approval of updating by the first member, update the security setting information for the first member; and one or more memories coupled to the one or more hardware processors, configured to provide the one or more hardware processors with instructions.

14. The server of claim 13, wherein the one or more hardware processors are further configured to:
obtain contextual information relating to the first terminal device; and
determine the security group based on the obtained contextual information.

15. The server of claim 14, wherein the one or more hardware processors are further configured to:
send an invitation to the first terminal device, the invitation configured to invite the first terminal device to join the security group; and
wherein the response is sent to the first terminal device in response to receiving a reply confirming joining the security group from the first terminal device.

16. The server of claim 13, wherein the one or more hardware processors are further configured to:
determine whether to permit the first terminal device to join the security group; and
wherein the response is sent to the first terminal device in response to a determination permitting the first terminal device to join the security group.

17. The server of claim 13, wherein the response comprises the security setting information or differences of security settings, wherein the differences of security settings are obtained by comparing the security setting information associated with the security group with security setting information currently configured at the first terminal device.

18. The server of claim 13, wherein the security setting information comprises a blacklist, and wherein the security setting information is obtained by:
receiving an authentication request from the second terminal device, the authentication request comprising a web address obtained by the second terminal device through a network the second terminal device is currently accessing;
determining whether the web address is secure;
in response to the determination that the web address is insecure, designating the network as an insecure network; and
adding the network to the blacklist.

19. The server of claim 13, wherein the security setting information comprises a blacklist, and wherein the security setting information is obtained by:
intercepting data packets received by the second terminal device via a network that the second terminal device is currently accessing;
determining whether the data packets are secure;
in response to the determination that the data packets are insecure, designating the network as an insecure network; and
adding the network to the blacklist.

20. The server of claim 13, wherein the security setting information comprises allowed modes for pushed information, and wherein the security setting information is obtained by:
receiving contextual information and corresponding allowed modes from the second terminal device, and the contextual information comprising voice information, image information, location information, or any combinations thereof;
determining a context which the second terminal device is at according to the contextual information; and
setting a mapping between the allowed modes and the context.

21. The server of claim 13, wherein the security setting information comprises access rights associated with applications, and wherein the security setting information is obtained by:
receiving a request from the second terminal device for configuring a designated application; and
configuring access rights for at least one other application when the designated application is executing, the at least one other application being an application other than the designated application.

22. The server of claim 16, wherein to determine whether to permit the first terminal device to join the security group comprises to:
in response to the request from the second terminal device, send an invitation to the first terminal device to join the security group, the invitation comprising an identifier for the security group; and
in response to a determination that the first terminal device receives the invitation to join the security group, permit the first terminal device to join the security group.

23. The server of claim 16, wherein to determine whether to permit the first terminal device to join the security group comprises to:
query at least one other member of the security group to determine whether to permit the first terminal device to join the security group; and
permit the first terminal device to join the security group in response to the determination that the at least one other member permits the first terminal device to join the security group.

24. The server of claim 13, wherein mappings between the security setting information and contextual information are stored, and the one or more hardware processors are further configured to:
in response to a transitioning request that includes contextual information from a third member of the security group, transition security setting information of the third member to security setting information corresponding to the contextual information based on the mappings.

25. A method for configuring security settings, comprising:
sending a request, from a first terminal device, to join a security group to a server, the request comprising a security group identifier;
receiving a response from the server, at the first terminal device, the response including security setting information associated with the security group and instructing the first terminal device to configure security settings according to the included security setting information associated with the security group, wherein the server saves the security setting information associated with the security group;

in response to the received response, configuring, by the first terminal device, the security settings based on the security setting information, wherein the first terminal device is associated with a first member of the security group;
receiving a query, at the first terminal device, from the server regarding whether to update the security setting information, wherein the update was received from a second terminal device associated with a second member of the security group, wherein the second member is different from the first member, wherein the second terminal device is different from the first terminal device;
sending a reply, from the first terminal device, to indicate approval by the first member of the update; and
subsequently receiving, at the first terminal device, the update to the security setting information from the server.

26. The method of claim 25, further comprising:
receiving an invitation to join the security group from the server, the invitation configured to invite the first terminal device to join the security group; and
wherein the response is received from the server at the first terminal device in response to sending a reply confirming joining the security group from the first terminal device.

27. The method of claim 25, wherein the response comprises the security setting information, and wherein the configuring of the security settings based on the security setting information comprises:
replacing security setting information currently configured at the first terminal device with the security setting information.

28. The method of claim 25, wherein the request further comprises security setting information currently configured at the first terminal device, wherein the response comprises differences of security settings, wherein the differences of security settings are obtained by comparing the security setting information associated with the security group with the security setting information currently configured at the first terminal device, and wherein the configuring of the security settings based on the security setting information comprises updating the security setting information currently configured at the first terminal device with the differences of security settings.

29. The method of claim 25, wherein the server is configured to save mappings between the security setting information and contextual information, and the method further comprising:
sending a transitioning request to the server, the transitioning request comprising contextual information acquired by the first terminal device;
receiving a response from the server; and
transitioning security setting information of the first terminal device to security setting information corresponding to the contextual information based on the mappings.

30. The method of claim 25, wherein the security setting information comprises a blacklist, and the method further comprising: using the blacklist to intercept access to web addresses on the blacklist, to recognize insecure web addresses based on the blacklist and thereby intercept access to the web addresses, to intercept data packets received from networks on the blacklist, to identify insecure data packets received from insecure networks based on the blacklist and thereby intercept data packets received from the insecure networks.

31. The method of claim 25, wherein the security setting information comprises allowed modes for pushed information, and wherein the first terminal device is configured to receive pushed information based on the allowed modes.

32. The method of claim 25, wherein the security setting information comprises access rights associated with applications, the access rights being configured for at least one other application when a designated application is executing, the at least one other application being an application other than the designated application, and wherein the first terminal device restricts access of the at least one other application based on the access rights during execution of the designated application.

33. A first terminal device, comprising:
one or more hardware processors configured to:
send a request, from the first terminal device, to join a security group to a server, the request comprising a security group identifier;
receive a response from the server at the first terminal device, the response including security setting information associated with the security group and instructing the first terminal device to configure security settings according to the included security setting information associated with the security group, wherein the server saves the security setting information associated with the security group;
in response to the received response, configure, by the first terminal device, the security settings based on the security setting information, wherein the first terminal device is associated with a first member of the security group;
receive a query, at the first terminal device, from the server regarding whether to update the security setting information, wherein the update was received from a second terminal device associated with a second member of the security group, wherein the second member is different from the first member, wherein the second terminal device is different from the first terminal device;
send a reply, from the first terminal device, to indicate approval by the first member of the update; and
subsequently receive, at the first terminal device, the update to the security setting information from the server; and
one or more memories coupled to the one or more hardware processors, configured to provide the one or more hardware processors with instructions.

34. The first terminal device of claim 33, wherein the one or more hardware processors are further configured to:
receive an invitation to join the security group from the server, the invitation configured to invite the first terminal device to join the security group; and
wherein the response is received from the server at the first terminal device in response to sending a reply confirming joining the security group from the first terminal device.

35. The first terminal device of claim 33, wherein the response comprises the security setting information, and wherein to configure the security settings based on the security setting information comprises to:
replace security setting information currently configured at the first terminal device with the security setting information.

36. The first terminal device of claim 33, wherein the request further comprises security setting information currently configured at the first terminal device, wherein the response comprises differences of security settings, wherein the differences of security settings are obtained by comparing the security setting information associated with the security group with the security setting information currently configured at the first terminal device, and wherein to configure the security settings based on the security setting information comprises to:
    update the security setting information currently configured at the first terminal device with the differences of security settings.

37. The first terminal device of claim 33, wherein the server is configured to save mappings between the security setting information and contextual information, and the one or more hardware processors are further configured to:
    send a transitioning request to the server, the transitioning request comprising contextual information acquired by the first terminal device;
    receive a response from the server; and
    transition security setting information of the first terminal device to security setting information corresponding to the contextual information based on the mappings.

38. The first terminal device of claim 33, wherein the security setting information comprises a blacklist, and one or more processors are further configured to:
    intercept access to web addresses on the blacklist, recognize insecure web addresses based on the blacklist and thereby intercept access to the web addresses, intercept data packets received from networks on the blacklist, identify insecure data packets received from insecure networks based on the blacklist and thereby intercept data packets received from the insecure networks.

39. The first terminal device of claim 33, wherein the security setting information comprises allowed modes for pushed information, and wherein the one or more hardware processors are further configured to receive pushed information based on the allowed modes.

40. The first terminal device of claim 33, wherein the security setting information comprises access rights associated with applications, the access rights being configured for at least one other application when a designated application is executing, the at least one other application being an application other than the designated application, and wherein the one or more hardware processors are further configured to restrict access of the at least one other application based on the configured access rights during execution of the designated application.

41. A computer program product, the computer program product being embodied in a tangible computer readable storage medium and comprising computer instructions for:
    receiving, at a server, a request to join a security group from a first terminal device, the request comprising a security group identifier;
    obtaining, by the server, security setting information associated with the security group;
    sending a response to the first terminal device, the response including security setting information associated with the security group and instructing the first terminal device to join the security group and to configure security settings according to the included security setting information, wherein the first terminal device is associated with a first member of the security group;
    in response to receiving an update to the security setting information of the security group from a second terminal device associated with a second member of the security group, querying, by the server, the first terminal device associated with the first member of the security group whether to update security setting information for the first terminal device, wherein the second member is different from the first member, wherein the second terminal device is different from the first terminal device; and
    in response to a reply sent by the first terminal device to indicate an approval of updating by the first member, updating the security setting information for the first member.

42. A computer program product, the computer program product being embodied in a tangible computer readable storage medium and comprising computer instructions for:
    sending a request, from a first terminal device, to join a security group to a server, the request comprising a security group identifier;
    receiving a response from the server, at the first terminal device, the response including security setting information associated with the security group and instructing the first terminal device to configure security settings according to the included security setting information associated with the security group, wherein the server saves the security setting information associated with the security group;
    in response to the received response, configuring, by the first terminal device, the security settings based on the security setting information, wherein the first terminal device is associated with a first member of the security group;
    receiving a query, at the first terminal device, from the server regarding whether to update the security setting information, wherein the update was received from a second terminal device associated with a second member of the security group, wherein the second member is different from the first member, wherein the second terminal device is different from the first terminal device;
    sending a reply, from the first terminal device, to indicate approval by the first member of the update; and
    subsequently receiving, at the first terminal device, the update to the security setting information from the server.

* * * * *